US009180673B2

(12) United States Patent  
Studer et al.

(10) Patent No.: US 9,180,673 B2  
(45) Date of Patent: Nov. 10, 2015

(54) LIQUID SUPPLY

(75) Inventors: Anthony D Studer, Albany, OR (US);  
Paul Mark Haines, Lebanon, OR (US);  
Bruce A McFadden, Vancouver, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/373,958

(22) PCT Filed: Apr. 30, 2012

(86) PCT No.: PCT/US2012/035792  
§ 371 (c)(1),  
(2), (4) Date: Jul. 23, 2014

(87) PCT Pub. No.: WO2013/165353  
PCT Pub. Date: Nov. 7, 2013

(65) Prior Publication Data  
US 2014/0362145 A1 Dec. 11, 2014

(51) Int. Cl.  
B41J 2/175 (2006.01)  
B41J 29/13 (2006.01)  
B23P 19/04 (2006.01)

(52) U.S. Cl.  
CPC ............. *B41J 2/175* (2013.01); *B23P 19/04* (2013.01); *B41J 2/17509* (2013.01); *B41J 2/17523* (2013.01); *B41J 2/17553* (2013.01); *B41J 29/13* (2013.01); *Y10T 29/49904* (2015.01)

(58) Field of Classification Search  
USPC ........................................................ 347/86  
See application file for complete search history.

(56) References Cited

U.S. PATENT DOCUMENTS

| 5,400,066 | A |   | 3/1995  | Matsumoto et al. |
|-----------|---|---|---------|------------------|
| 5,777,647 | A | * | 7/1998  | Pawlowski et al. ............. 347/86 |
| 5,886,718 | A |   | 3/1999  | Johnson et al. |
| 5,988,801 | A |   | 11/1999 | Coiner |
| 5,992,975 | A |   | 11/1999 | Gasvoda et al. |
| 6,183,076 | B1 |  | 2/2001  | Childers et al. |
| 6,203,146 | B1 |  | 3/2001  | Pawlowksi, Jr. et al. |
| 6,220,702 | B1 |  | 4/2001  | Nakamura et al. |
| 6,264,318 | B1 |  | 7/2001  | Oda et al. |
| 6,698,869 | B2 |  | 3/2004  | Vosahlo |

(Continued)

FOREIGN PATENT DOCUMENTS

EP 0838339 A2 4/1998  
JP 3120070 5/1991

(Continued)

OTHER PUBLICATIONS

International Search Report for Application No. PCT/US2012/035792. Report issued Dec. 14, 2012.

(Continued)

*Primary Examiner* — Stephen Meier  
*Assistant Examiner* — John P Zimmermann  
(74) *Attorney, Agent, or Firm* — Hewlett-Packard Patent Department

(57) ABSTRACT

In one example, an ink supply assembly that may be installed into a printer as a single unit while holding ink includes a first sub-assembly having a primary container to hold ink and a secondary container enclosing the primary container and configured to fit inside the printer. The assembly also includes a a second sub-assembly having an ink supply to receive ink from the primary container through a conduit and to deliver ink to a printhead.

19 Claims, 13 Drawing Sheets

(56) References Cited

U.S. PATENT DOCUMENTS

| | | |
|---|---|---|
| 6,817,699 B2 | 11/2004 | Hirashima et al. |
| 7,004,575 B2 * | 2/2006 | Inoue et al. .................... 347/86 |
| 7,258,432 B2 | 8/2007 | Silverbrook |
| 7,258,435 B2 | 8/2007 | Silverbrook |
| 7,470,002 B2 | 12/2008 | Hibbard et al. |
| 7,488,059 B1 | 2/2009 | Holland et al. |
| 7,722,161 B2 | 5/2010 | Hibbard et al. |
| 7,922,312 B2 | 4/2011 | Haines et al. |
| 8,085,432 B2 | 12/2011 | Hattori et al. |
| 8,113,612 B2 | 2/2012 | Levy et al. |
| 2001/0040613 A1 | 11/2001 | Nakazawa et al. |
| 2004/0218021 A1 | 11/2004 | Ishizawa et al. |
| 2005/0030358 A1 * | 2/2005 | Haines et al. .................... 347/93 |
| 2005/0041061 A1 | 2/2005 | Ishizawa et al. |
| 2005/0062811 A1 | 3/2005 | Ishizawa et al. |
| 2006/0250461 A1 * | 11/2006 | Silverbrook et al. ........... 347/86 |
| 2007/0024688 A1 * | 2/2007 | Rochford et al. ............. 347/108 |
| 2008/0259112 A1 | 10/2008 | Olsen et al. |
| 2008/0316282 A1 | 12/2008 | Osawa et al. |
| 2008/0316284 A1 | 12/2008 | Osawa et al. |
| 2009/0179972 A1 | 7/2009 | Yamamoto |
| 2010/0045755 A1 | 2/2010 | Kobayashi |
| 2015/0009267 A1 | 1/2015 | Haines |

FOREIGN PATENT DOCUMENTS

| | | |
|---|---|---|
| JP | 2000280486 | 10/2000 |
| JP | 2001080088 A | 3/2001 |
| JP | 2002240313 | 8/2002 |
| JP | 2003053984 | 2/2003 |
| JP | 2004284353 | 10/2004 |
| JP | 2009023232 | 2/2009 |
| JP | 2009241355 | 10/2009 |
| WO | WO-0068017 A1 | 11/2000 |

OTHER PUBLICATIONS

Korean Intellectual Property Office, International Search Report and Written Opinion for PCT/US2012/036462 dated Mar. 19, 2013 (8 pages).

The International Bureau of WIPO, International Preliminary Report on Patentability for PCT/US2012/035792 dated Nov. 13, 2014 (8 pages).

The International Bureau of WIPO, International Preliminary Report on Patentability for PCT/US2012/036462 dated Nov. 13, 2014 (5 pages).

* cited by examiner

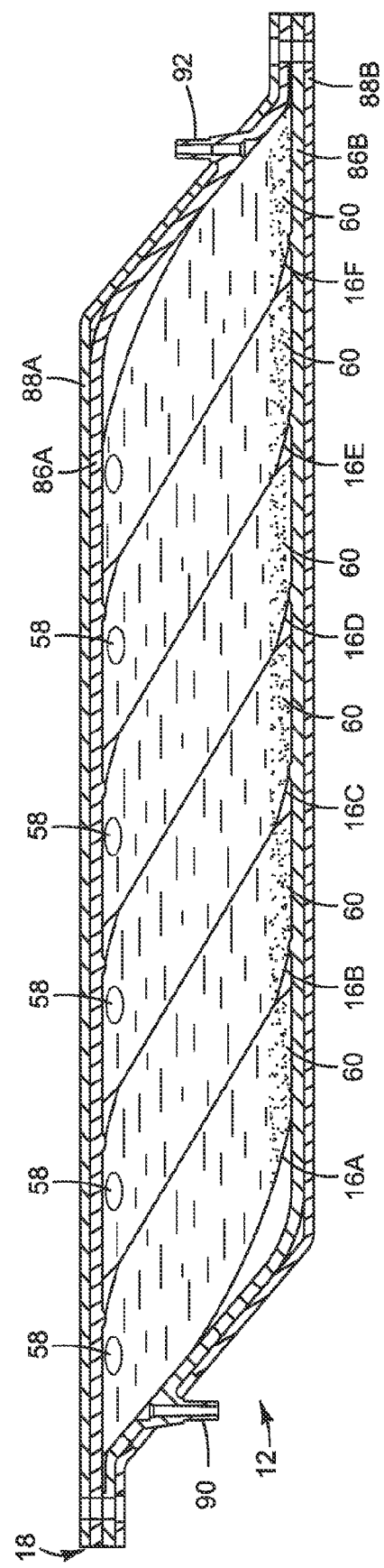

LIQUID SUPPLY

CROSS-REFERENCE TO RELATED APPLICATION

This application is a national stage application under 35 U.S.C. §371 of PCT/US2012/035792, filed Apr. 30, 2012.

BACKGROUND

Conventional off-axis ink supply systems for higher volume inkjet printers usually include a set of large, replaceable ink containers connected to the printhead(s) through flexible tubes with some sort of backpressure regulation. These ink supply system components are provided separately to the printer factory where they are assembled into the printer.

DRAWINGS

FIGS. 13 and 14 are exploded and section views of the storage sub-assembly shown in FIG. 12.

The same part numbers designate the same or similar parts throughout the figures.

DESCRIPTION

Figure 1:
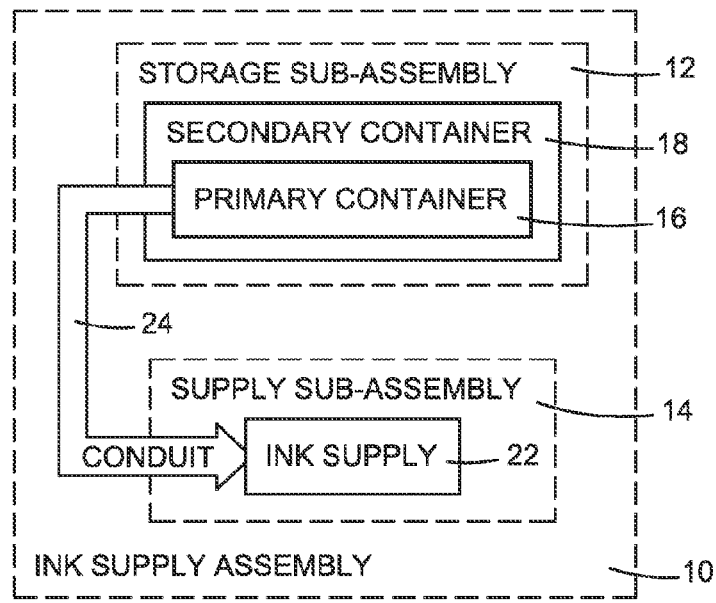
FIG. 1 is a block diagram illustrating one example of a new ink supply assembly for an inkjet printer.

Shipping ink supply system components separately for assembly at the printer factory, as noted above, presents some challenges to maintain good quality. For example, the multiple unconnected fluid connectors must be specially protected during shipping and handling, and often less well trained workers at the printer factory make the fluid connections between ink supply system components. Fluid connections are tested for the first time at the printer factory and, if problems are discovered, fixing those problems can be more difficult due to the presence of other printer components. Also, large volume ink supply systems are usually targeted to high volume users in which long term containment is not a significant issue.

A new ink supply system has been developed to deliver a lifetime supply of ink to low volume inkjet users. In one example, the new system is configured as an assembly that may be installed into a printer as a single unit while holding ink. The ink supply assembly includes a first sub-assembly that has a primary container (or multiple containers) to hold ink and a secondary container enclosing the primary container(s). The secondary container is configured to fit inside the printer housing. The ink supply assembly also includes a second sub-assembly that has an ink supply (or multiple ink supplies) to receive ink from the primary container and to deliver ink to the printhead(s). A conduit connected between the primary container and the ink supply allows ink to flow from the primary container to the ink supply.

In this example, the modular ink supply system allows simple "drop-in" installation into the printer. The self-contained system can be assembled, filled, and tested at a remote location and then shipped to the printer factory for installation into the printer. The bags or other suitable primary ink containers may have a sufficiently large to capacity to hold enough ink to print a minimum number of pages that corresponds to a predetermined expected useful life of the printer. In one example, ink bags are arranged within the secondary container so that any air trapped in a bag floats to the top and pigment particles and other debris sink to the bottom. The ink outlet from each bag is positioned at the vertical center of the ink column to help deliver good quality ink over the full life of the ink supply.

Examples of a new liquid supply system are described with reference to ink and inkjet printing. However, the new liquid supply system is not limited to ink and inkjet printers but may be implemented in other inkjet type dispensers using liquids other than ink. The examples shown in the figures and described below, therefore, illustrate but do not limit the invention, which is defined in the Claims following this Description As used in this document, "liquid" means a fluid not composed primarily of a gas or gases, including but not limited to ink; "on-axis" describes a part that is carried back and forth across a media path in a scanning type inkjet printer or other inkjet type liquid dispenser when the part is installed in the dispenser; "off-axis" describes a part that is not carried back and forth across the media path in a scanning type inkjet liquid dispenser when the part is installed in the dispenser; and a "printhead" means that part of an inkjet printer or other inkjet type dispenser that dispenses ink or another liquid from one or more openings, for example as drops or streams.

Figure 2:
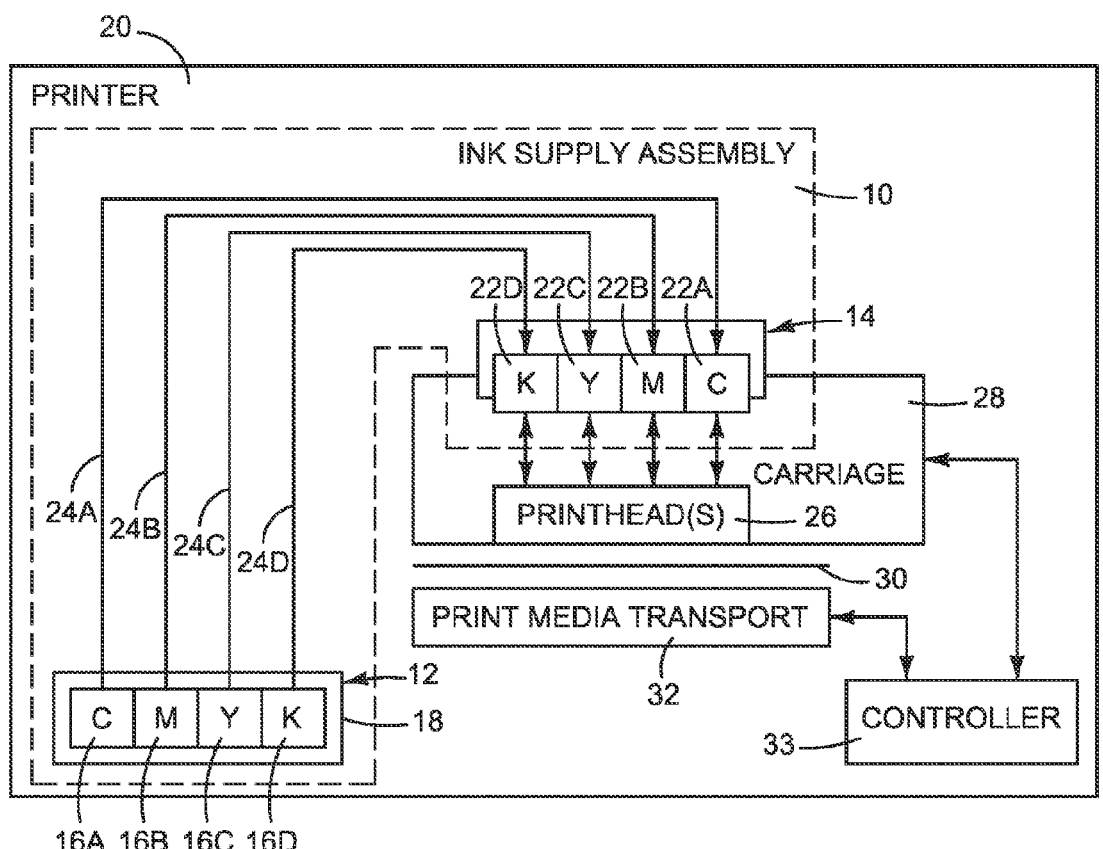
FIG. 2 is a block diagram illustrating one example of an inkjet printer implementing a new ink supply assembly, such as the ink supply assembly shown in FIG. 1.

FIG. 1 is a block diagram illustrating one example of a new ink supply assembly for an inkjet printer. FIG. 2 is a block diagram illustrating one example of an inkjet printer implementing a new ink supply assembly, such as the ink supply assembly shown in FIG. 1. Referring to FIGS. 1 and 2, ink supply assembly 10 includes a first, storage sub-assembly 12 and a second, supply sub-assembly 14. Storage sub-assembly 12 includes a primary container 16 to hold ink and a secondary container 18 enclosing primary container 16. Secondary container 18 is configured to fit inside the printer 20. For example, a collapsible primary containment bag 16 holding a life-time (for the printer) supply of ink is enclosed in a rigid secondary containment shell 18. For monochrome printing, a single primary containment bag 16 may hold black ink. For color printing, multiple primary containment bags 16A, 16B, 16C, and 16D may each hold a different color ink, cyan (C), magenta (M), yellow (Y), and black (K) for example.

Supply sub-assembly 14 includes an ink supply 22 connected to primary container 16 through a conduit 24 for supplying ink to a printhead 26. Ink supply 22 usually will include a smaller ink holding chamber and a pressure regulator to establish a negative pressure inside the ink holding chamber. Any suitable pressure regulator may be used including, for example, a foam block or a spring bag. Also, while a printhead 26 separate from ink supply 22 is shown, printhead 26 may be integrated into ink supply 22. For monochrome printing, a single ink supply 22 may supply black ink to a single printhead 26. For color printing, multiple ink supplies 22A, 22B, 22C, and 22D may supply a different color ink to one or more printheads 26.

Referring now specifically to FIG. 2, printer 20 includes a movable carriage 28 carrying printheads 26 and ink supplies 22A-22D back and forth across a sheet or web of print media 30. Thus, ink supplies 22A-22D hold ink on-axis for delivery to the on-axis printheads 26 while ink containers 16A-16D store ink off-axis. Printer 10 also includes a print media transport mechanism 32 for moving print media 30 past printheads 26. A controller 33 includes the programming, processor(s) and associated memories, and the electronic circuitry and components needed to control the operative elements of printer 20.

Figure 3:
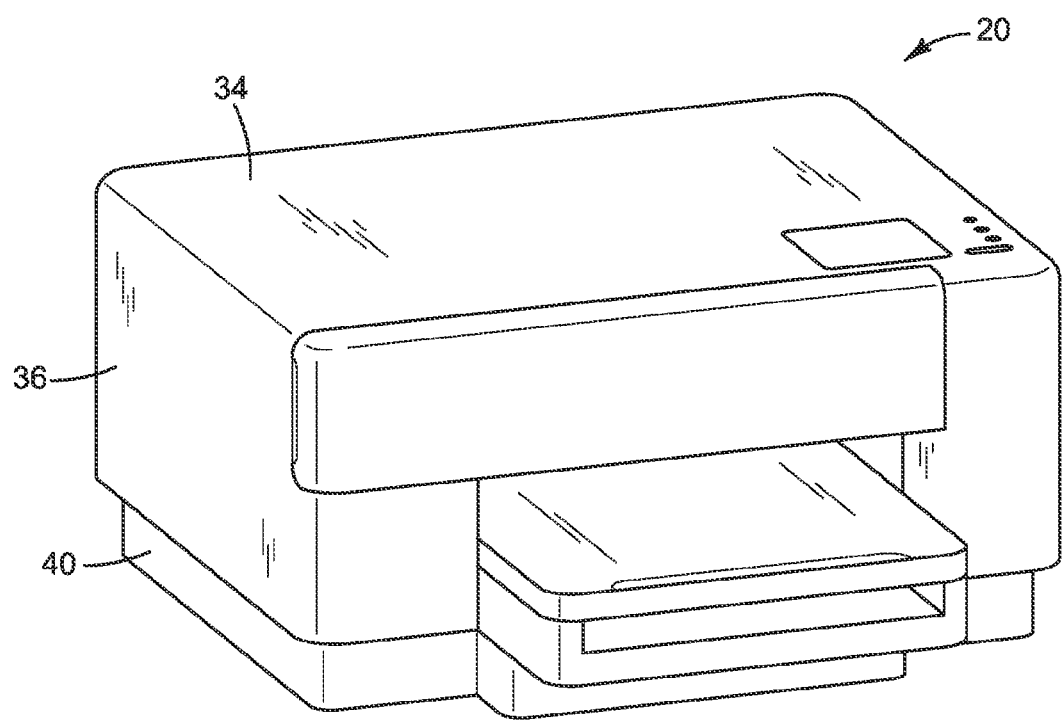
FIGS. 3 and 4 are perspective views of an inkjet printer, such as the printer shown in the block diagram of FIG. 2, implementing one example of the new ink supply assembly.
Figure 4:
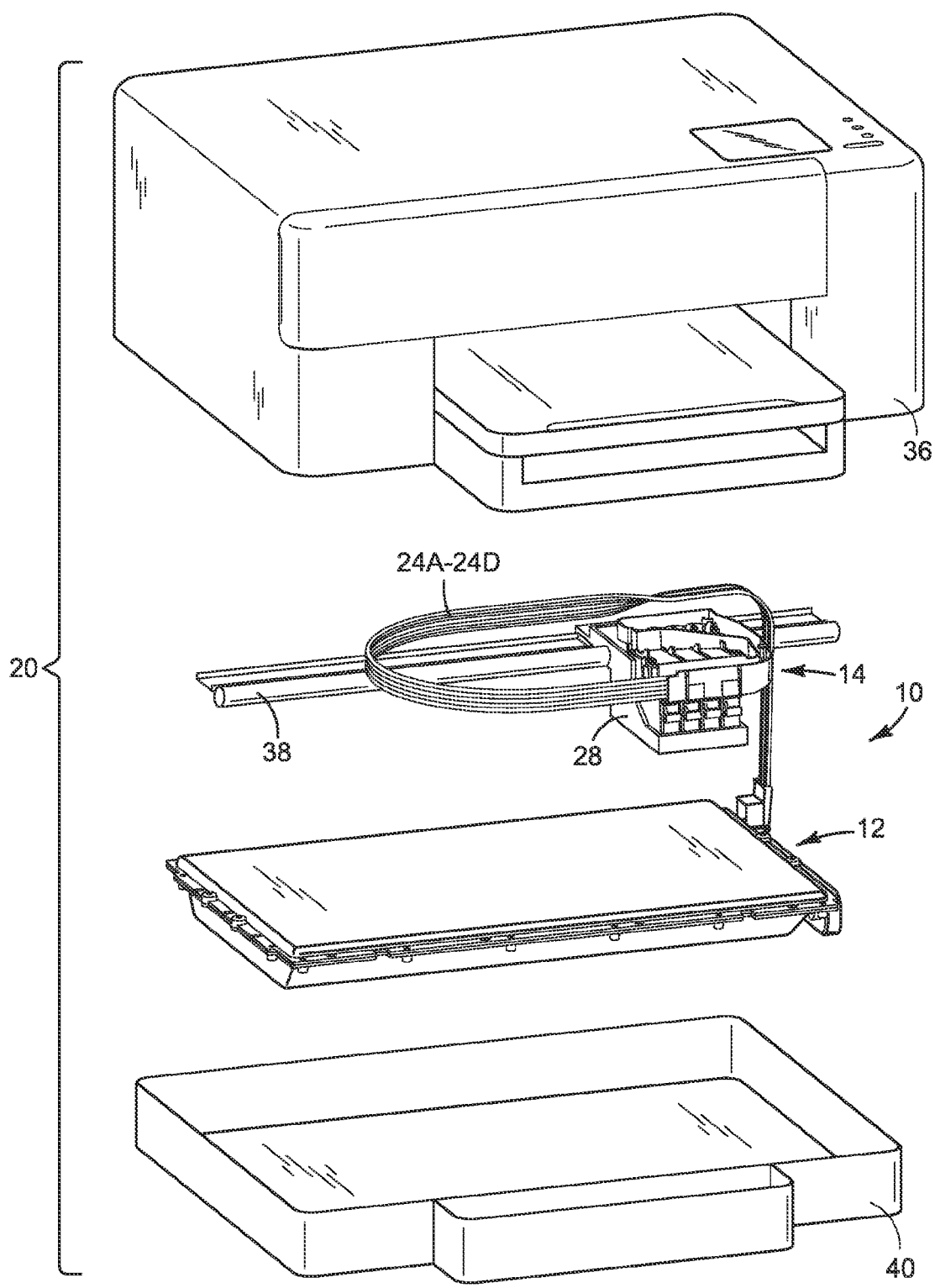
Figure 5:
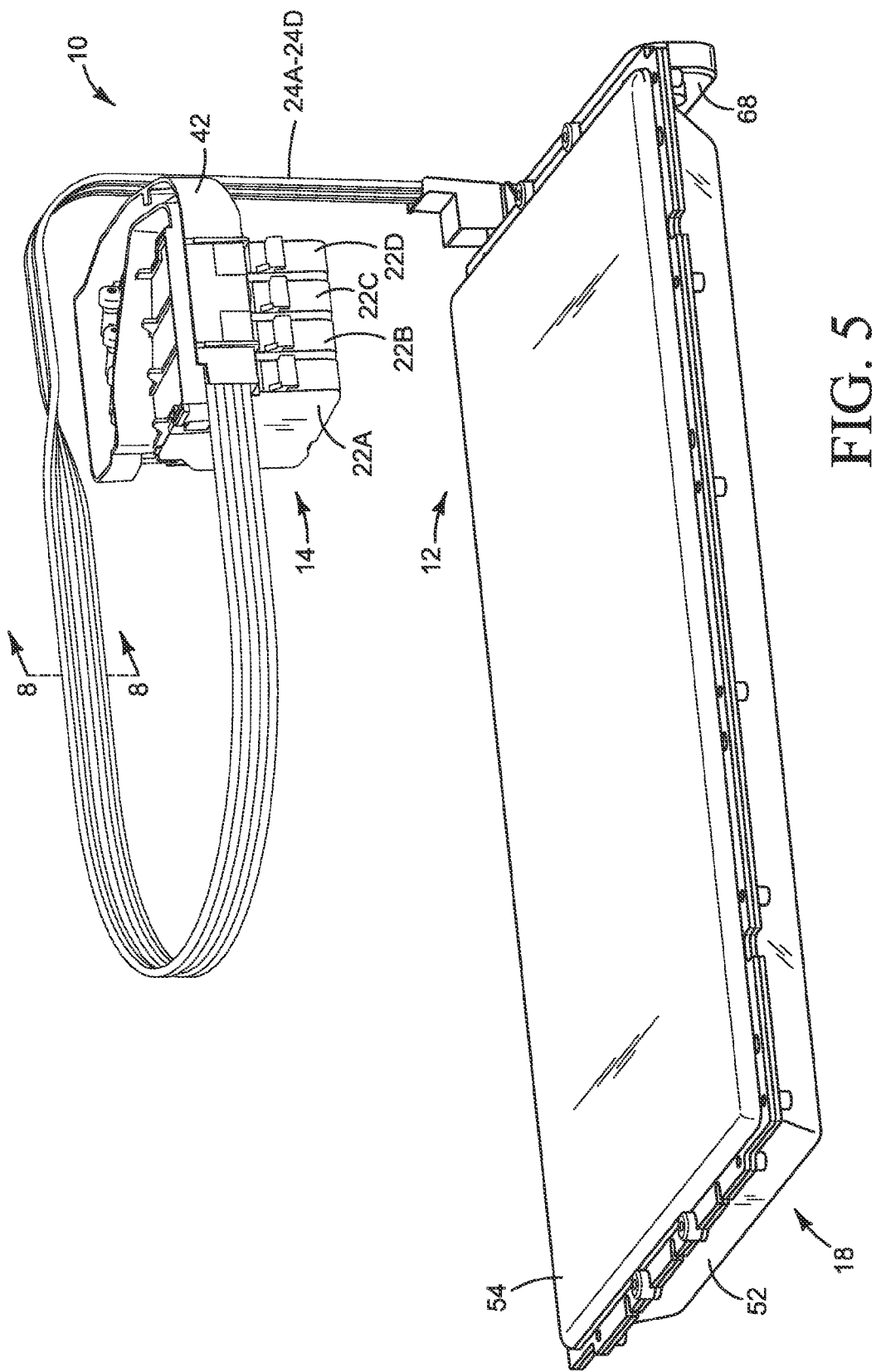
FIGS. 5 and 6 are perspective views illustrating an example of the new ink supply assembly.
Figure 6:
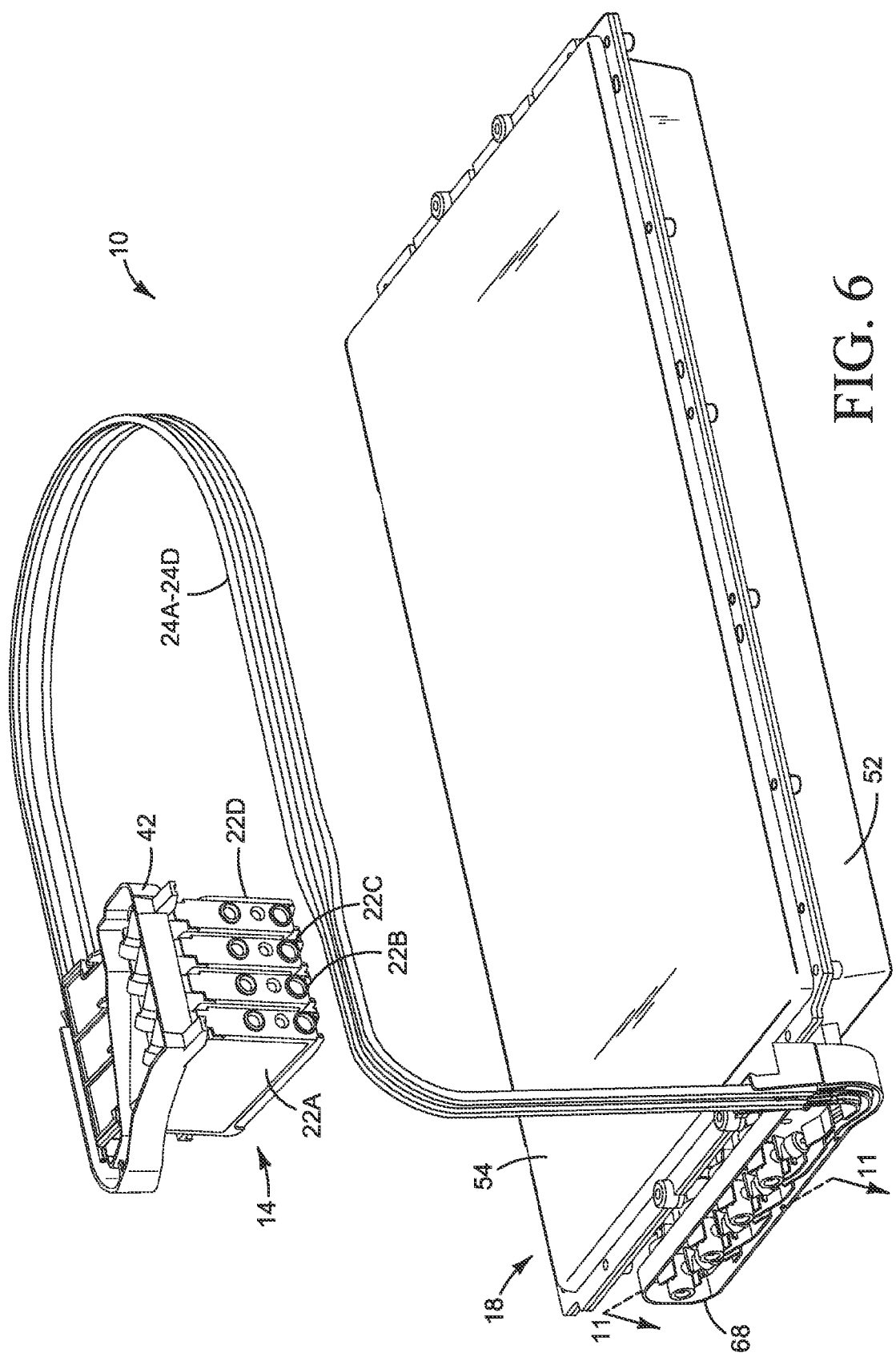
Figure 7:
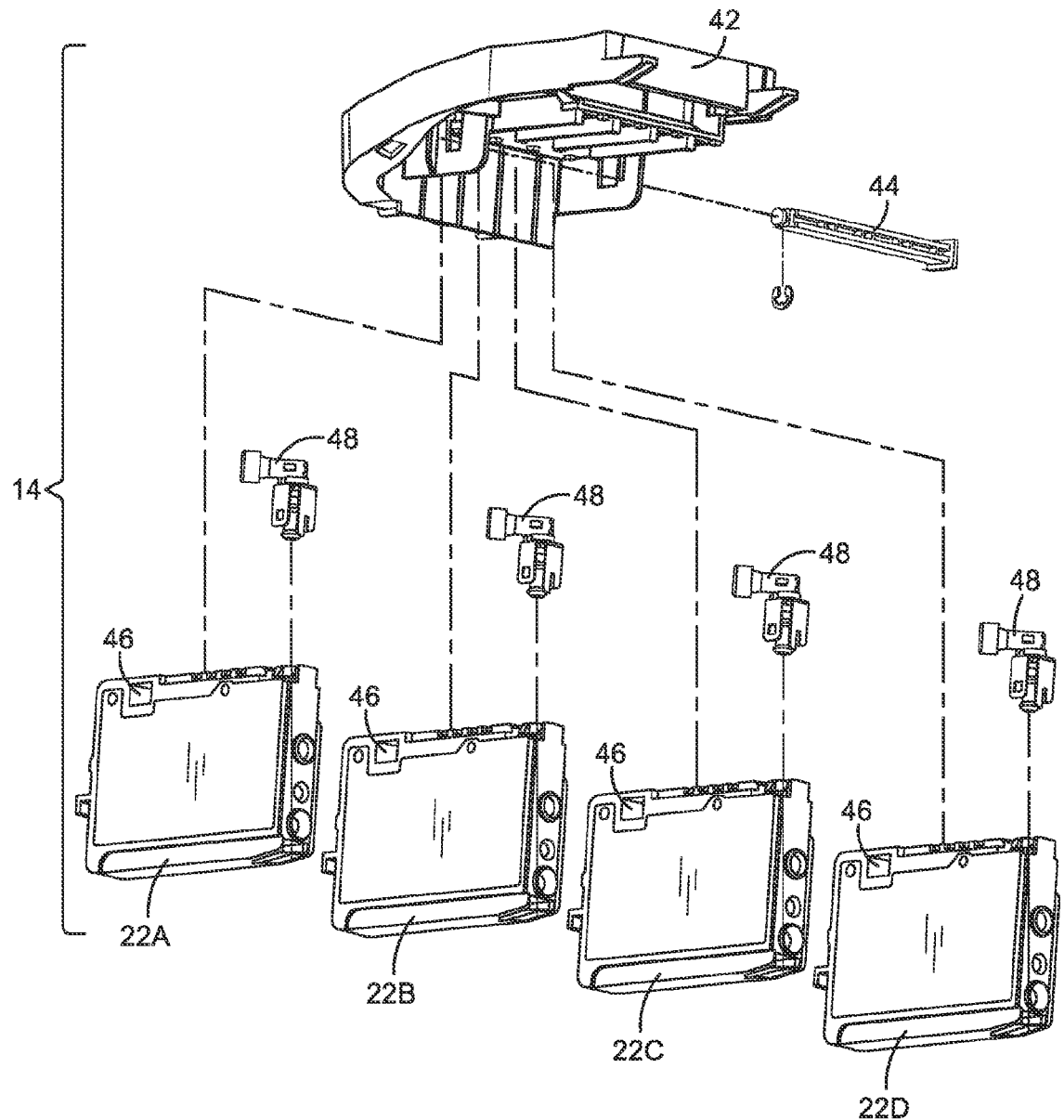
FIG. 7 is an exploded view of the upper, supply sub-assembly in the assembly shown in FIGS. 5 and 6.
Figure 8:
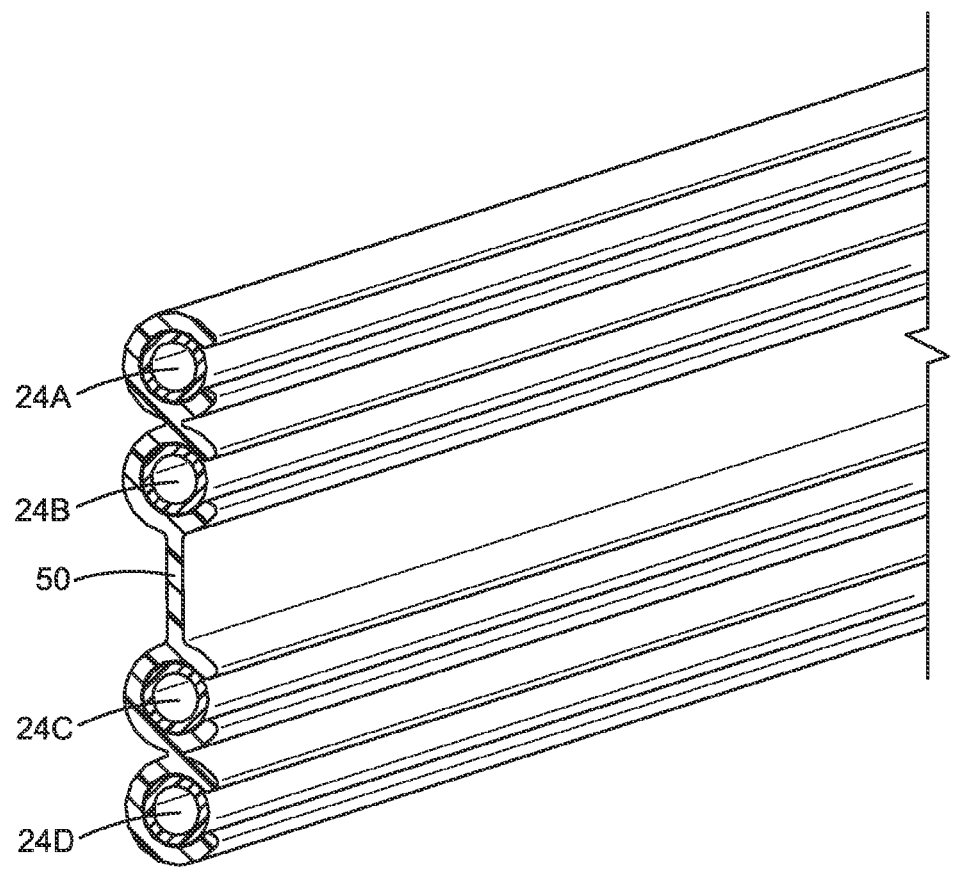
FIG. 8 is a detail view of the conduits that connect the ink holding bags in the lower, storage sub-assembly to the ink supplies in the supply sub-assembly in the assembly shown in FIGS. 5 and 6.

FIGS. 3 and 4 are perspective views illustrating an inkjet printer 20 implementing one example of an ink supply assembly 10. FIGS. 5 and 6 are perspective views illustrating ink supply assembly 10 from FIG. 4. FIGS. 7-11 show the components of assembly 10 in more detail. Referring first to FIGS. 3 and 4, the printer housing 34 includes a top part 36 housing carriage 28 carrying ink supply sub-assembly 14 (on guide rail 38) and a bottom part 40 housing ink storage sub-assembly 12. Referring now to FIGS. 5-11, ink supply sub-assembly 14 includes multiple ink supplies 22A-22D ganged together as a unit in carriage 28 (FIG. 4). As best seen in FIG. 7, each individual ink supply 22A-22D is mounted to a holder 42, for example using a peg 44 that extends through a hole 46 in each supply 22A-22D. Each ink supply 22A-22D is connected to a corresponding conduit 24A-24D, for example through a septum and needle type fluid interconnect fitting 48. A suitable mounting structure and fluid interconnect for ink supplies 22A-22D is shown and described in detail in international patent application no. PCT/US2012/34089, filed 18 Apr. 2012 and titled Fluid Coupling. The drawings (FIGS. 1-16) and the description (paragraphs [0003]-[0045]) of application no. PCT/US2012/34089 are incorporated herein by reference.

In the example shown, flexible conduits 24A-24D are formed in a loop that allows supply sub-assembly 14 to move back and forth with carriage 28 (FIG. 4) across the media path. Referring specifically to the section view of FIG. 8 (taken along line 8-8 in FIG. 5), each flexible conduit 24A-24D is supported in a protective raceway 50 that exhibits lateral rigidity (to support the conduits vertically) and lengthwise flexibility (to allow the conduit loop to expand and contract horizontally).

Figure 9:
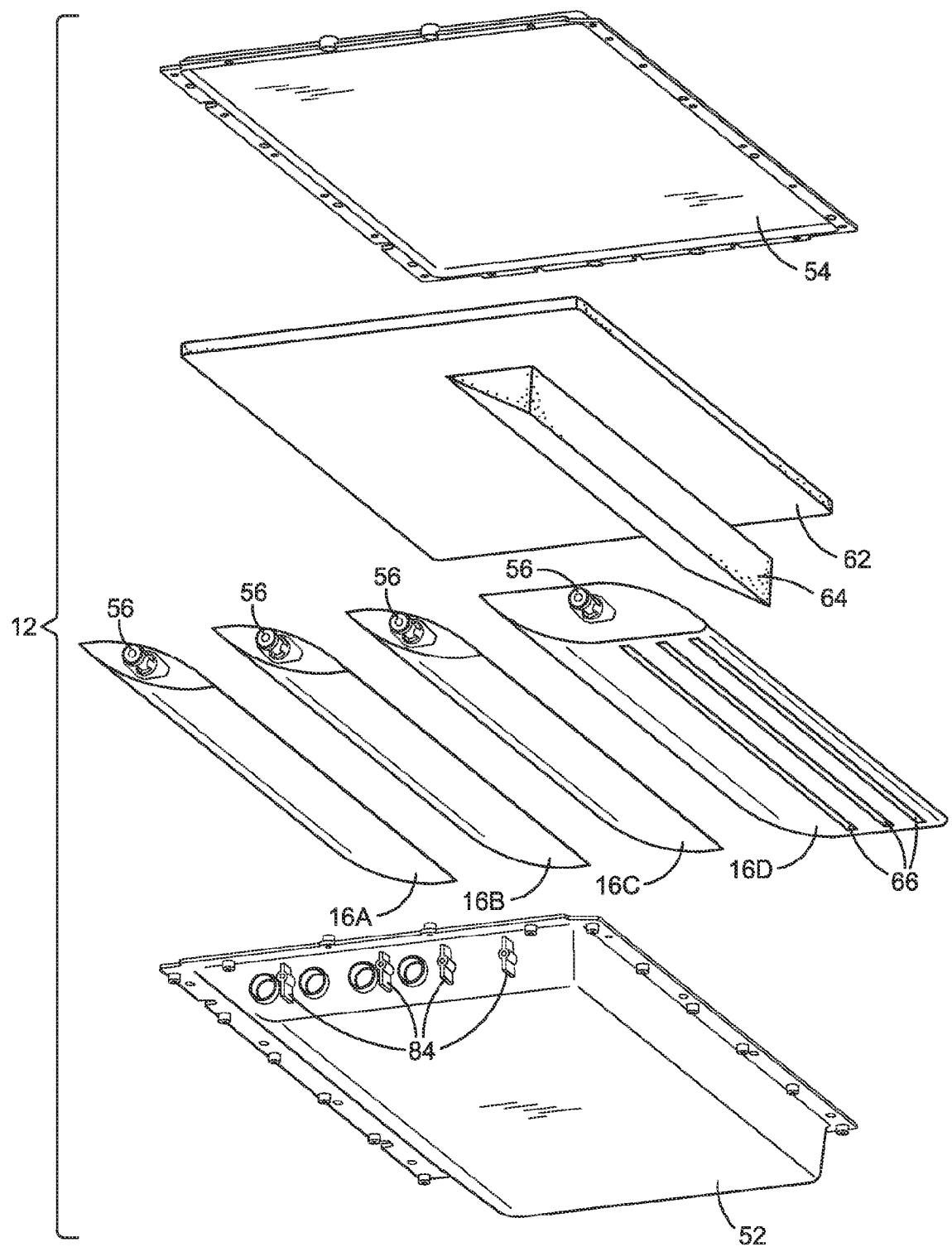
FIGS. 9 and 10 are exploded and section views of the storage sub-assembly in the assembly shown in FIGS. 5 and 6.
Figure 10:
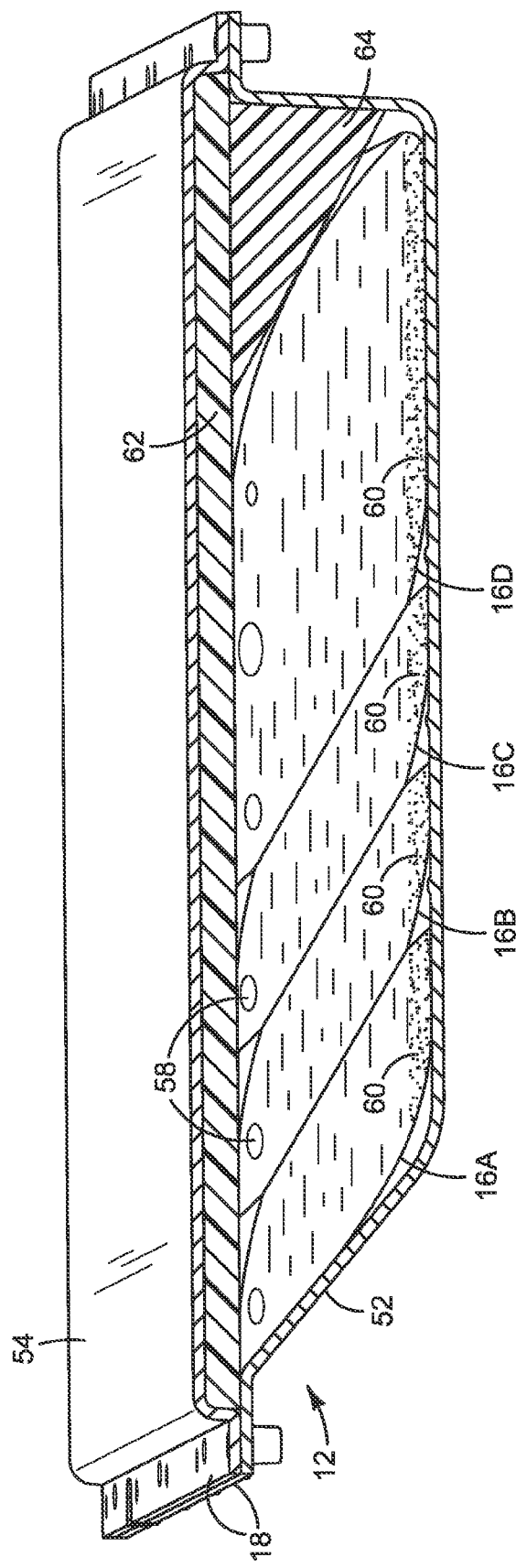

As best seen in FIGS. 9 and 10, storage sub-assembly 12 includes multiple primary ink containers 16A-16D fully enclosed together in a single secondary container 18. In the example shown, secondary container 18 includes a rigid tub 52 covered by a rigid lid 54 and each primary container 16A-16D is configured as a two sided, unpleated, collapsible bag. Each ink bag 16A-16D may be sized to contain enough ink to print a minimum number of pages that corresponds to a predetermined expected useful life of the printer. For example, for an inkjet printer designed for a typical application, cyan, magenta, and yellow ink bags 16A-16C each hold about 200 ml of ink and black ink bag 16D holds about 900 ml of ink, which is sufficient to print approximately 20,000 pages.

Ink bags 16A-16D are arranged diagonally, single file in a row in tub 52 such that each succeeding bag in the row rests against and overlaps the preceding bag in the row in the general shape of a parallelogram. Also, in the example shown, each outlet 56 is positioned along a mid-line of the row of bags so that ink is removed from each ink bag 16A-16D at the vertical center of the ink column when the bags are oriented horizontally. In this configuration, any air 58 in the bag will float to the top, above outlet 56, and pigment particles or other debris 60 will sink to the bottom, below outlet 56. Thus, air 58 and debris 60 are trapped away from the ink outlet to maximize the volume of uncontaminated ink that may be supplied from each bag 16A-16B. A two sided, unpleated/flat bag limits the number of corners to reduce the risk of leakage and to reduce the volume of wasted ink retained in the corners.

In the example shown, a layer 62 of absorbent material is sandwiched between container lid 54 and ink bags 16A-16D. While any ink leaking from bags 16A-16D will tend to collect in the bottom of container tub 52, absorber 62 will collect and retain any ink that may find its way to the top of bags 16A-16D to prevent ink from leaking from container 18. Also, in the example shown, a triangular shaped spacer 64 along one side of tub 52 helps shape and position bags 16A-16D. The use of a spacer 60 allows a more simple shape for tub 52, but other suitable configurations for tub 52 are possible that eliminate the need for a spacer. Spacer 60 may be made of an absorbent material to help contain any ink leakage. Adhesive strips 66 (FIGS. 9 and 13) may be used on some or all of the bags 16A-16D to help hold the bags in the desired position in tub 52.

Figure 11:
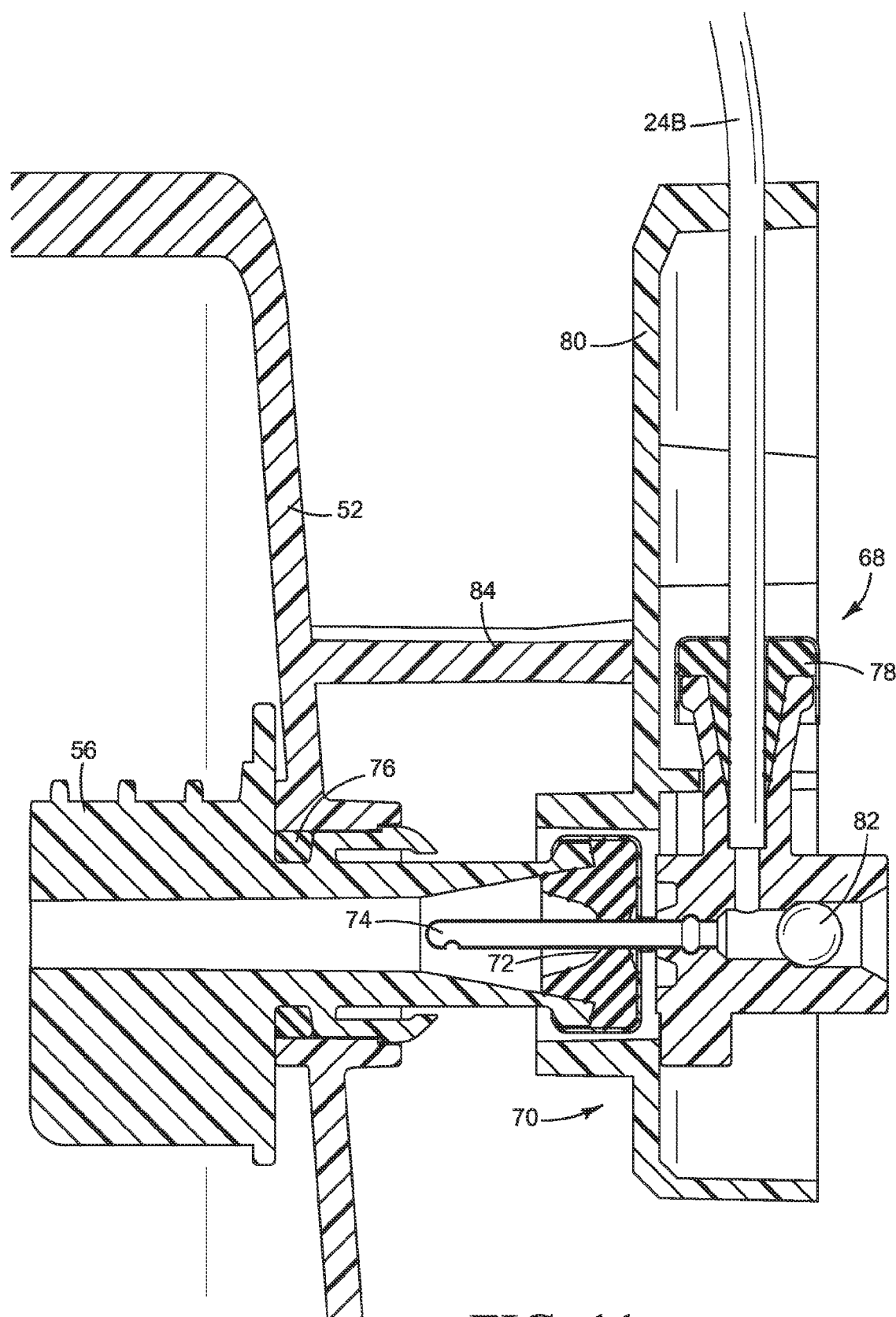
FIG. 11 is a detail section view illustrating the connection fitment on the lower, storage sub-assembly shown in FIG. 6.

FIG. 11 is a detail section view taken along the line 11-11 in FIG. 6, illustrating the connection fitment 68 on storage sub-assembly 12. Referring to FIG. 11, the outlet 56 from each ink bag extends through and is exposed outside secondary container tub 52. In the example shown, the fluid interconnection 70 between each outlet 56 and the corresponding conduit (conduit 24B in FIG. 11) is made through a septum 72 covering outlet 56 and a needle 74 connected to conduit 24B. A seal 76 seals outlet 56 to container tub 52. Another seal 78 seals needle 74 and conduit 24B to the body 80 of fitment 68. A ball cork 82 may be used to facilitate filling or evacuating the ink bag. Fitment 68 is structurally connected to container tub 52 through, for example, a series of abutments 84 (FIGS. 9 and 11). As best seen in FIG. 6, fitment 68 shrouds outlets 56 and interconnections 70 to help protect them from damage, for example during shipping and handling.

Figure 12:
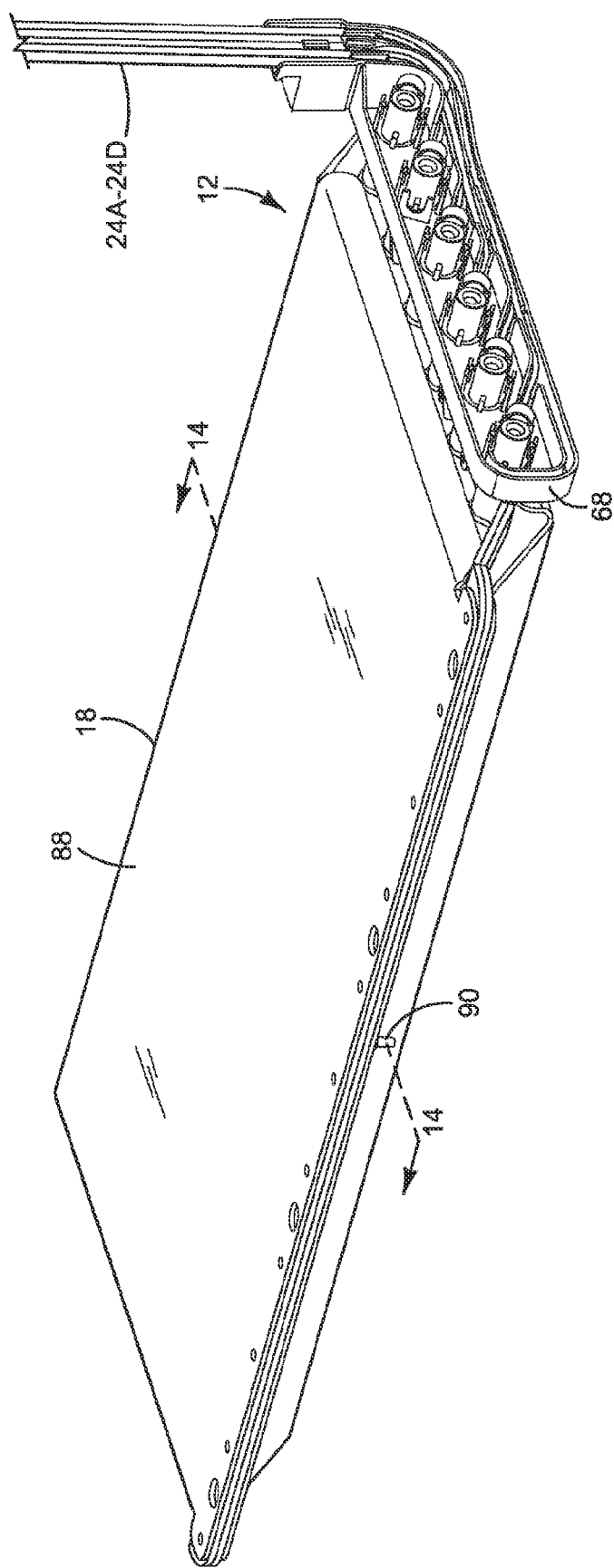
FIG. 12 is a perspective view illustrating another example of a storage sub-assembly such as might be used in the ink supply assembly of FIGS. 1-4.
Figure 13:
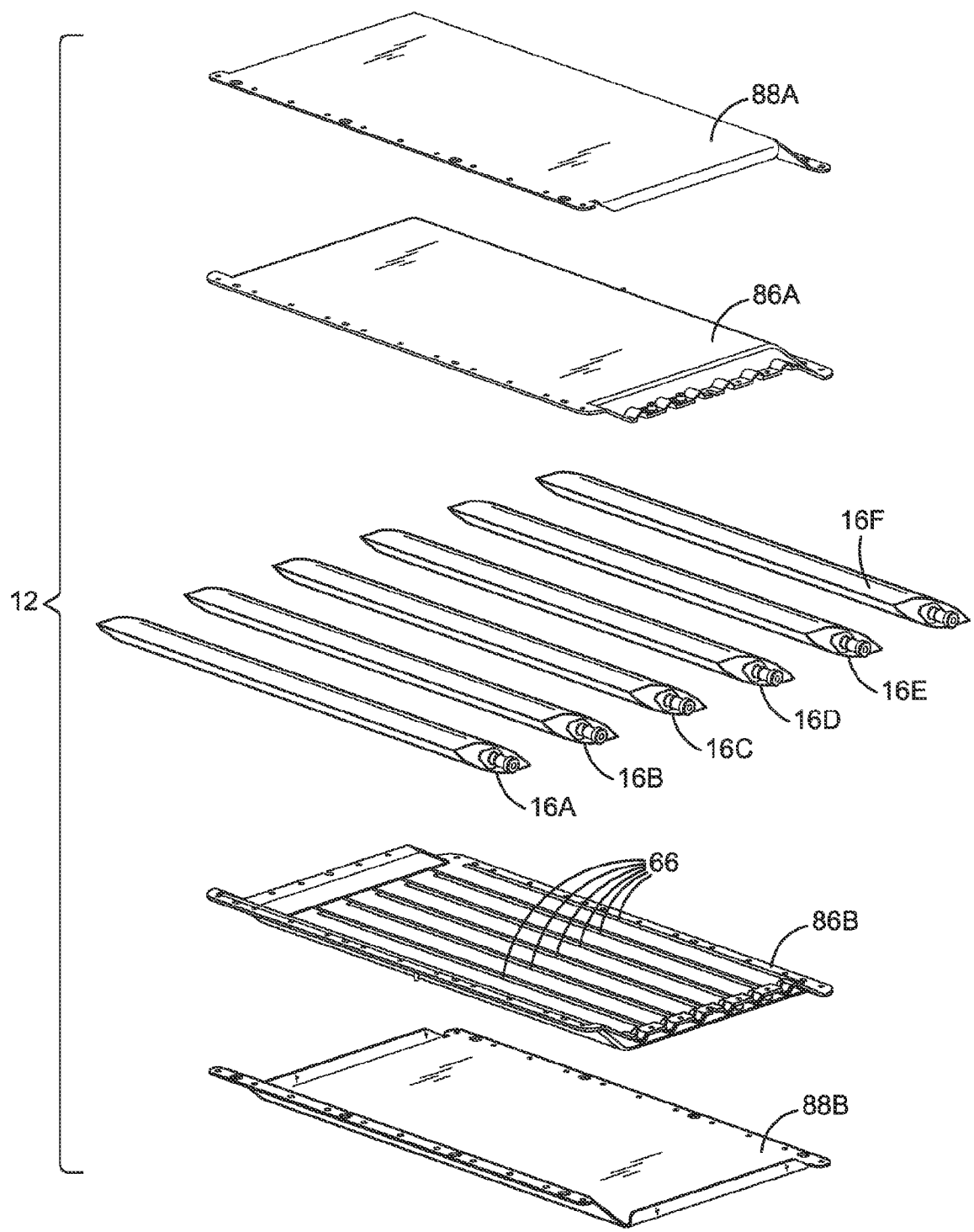

FIGS. 12-14 illustrate another example of a storage assembly 12, in which the secondary containment may be pressurized to squeeze ink out of the ink bags. Referring to FIGS. 12-14, secondary container 18 includes a sealed inner shell 86 housing ink bags 16A-16F and an outer shell 88 that resists internal pressurization. For example, a sealed inner shell 86 may be formed by welding together two interchangeable molded plastic pieces 86A and 86BA shaped to hold ink bags 16A-16F in the desired configuration. Similarly, outer shell 88 may be formed by fastening two interchangeable sheet metal pieces 88A and 88B to the outside of inner shell pieces 86A, 86B. An outer shell 88 may be omitted if inner shell 86 is made sufficiently strong to withstand pressurization or if pressurization is not desired.

Secondary container 18 may be pressurized after assembly through any suitable inlet 90 to the interior of inner shell 86. A vent 92 from the interior of inner shell 86 to the atmosphere may be used where pressurization is not desired or to relieve a pressurized shell 86. For example, during printing, the interior of inner shell 86 is pressurized through inlet 90 to squeeze ink out of the ink bags. The rate of pressurization is greater than the rate of venting during printing. When printing is completed, the pressurizing pump (not shown) is turned off and the interior of shell 86 gradually returns to atmospheric pressure by venting through vent 92.

Also, in the example shown in FIGS. 12-14, six identical ink bags 16A-16F are used to contain the ink. For a six color printing system, each bag 16A-16F may contain a different color ink. For a four color system, three bags 16D-16F may contain black ink. The use of identical ink bags allows a common bag design even when a larger volume of black ink is used, and captures the benefits of smaller bags for all of the ink colors. (These advantages, however, may be offset by the cost and complexity of the added fluid interconnection parts needed to carry ink to the supply sub-assembly.)

As noted at the beginning of this Description, the examples shown in the figures and described above illustrate but do not limit the invention. Other examples are possible. Therefore, the foregoing description should not be construed to limit the scope of the invention, which is defined in the following claims.

What is claimed is:

1. An ink supply assembly to be installed into a printer as a single unit while holding ink, the assembly comprising:
    a first sub-assembly including a primary container to hold ink and a secondary container enclosing the primary container, the secondary container to fit inside the printer, the secondary container to be pressurized via an inlet when the secondary container is installed inside the printer;
    a second sub-assembly including an ink supply to receive ink from the primary container and to deliver ink to a printhead; and
    a conduit connected between the primary container and the ink supply.

2. The assembly of claim 1, further comprising ink in the primary container, the ink supply, and the conduit prior to installation in the printer.

3. The assembly of claim 1, wherein the ink supply includes a pressure regulator to establish a negative pressure inside the ink supply when the assembly is primed with ink.

4. The assembly of claim 1, wherein the ink supply includes a space to hold ink and a pressure regulator to establish a negative pressure inside the ink space when the assembly is primed with ink.

5. The assembly of claim 1, wherein the primary container has a capacity sufficient to hold enough ink to print a minimum number of pages that corresponds to a predetermined expected useful life of the printer.

6. The assembly of claim 1, wherein:
    the first sub-assembly includes multiple primary containers and a single secondary container enclosing all of the primary containers, wherein each of the multiple primary containers is a two-sided unpleated collapsible bag, wherein the multiple primary containers are arranged diagonally and single file in a row such that each succeeding primary container rests against and partially overlaps the preceding primary container in the row, and such that a cross section of each of the multiple primary containers has a parallelogram shape;
    the second sub-assembly includes multiple ink supplies ganged together to install as a unit into a carriage in the printer; and
    the conduit comprises multiple conduits each connected between a primary container and a corresponding ink supply.

7. The assembly of claim 6, further comprising a different color ink in each of the respective connected primary containers, ink supplies, and conduits prior to installation in the printer.

8. A unit to be installed into a printer, comprising:
    multiple bags each to hold ink off-axis;
    a single housing containing the bags, wherein the housing is to be pressurized via an inlet when the unit is installed inside the printer;
    multiple rigid containers each to hold liquid on-axis for delivery to a printhead, the containers ganged as a unit and each container to establish a negative pressure inside the container when the supply unit is primed with liquid; and
    a loop of flexible conduits each connected between an ink bag and a container.

9. The unit of claim 8, wherein each container is to establish a negative pressure inside the container when the supply unit is primed with liquid.

10. The unit of claim 8, wherein the multiple bags are to hold a lifetime supply of ink for a predetermined expected useful life of the printer.

11. The unit of claim 10, wherein the housing is to contain the bags diagonally and single file in a row such that each succeeding bag rests against and partially overlaps the preceding bag in the row, and such that a cross section of each of the bags has a parallelogram shape.

12. The unit of claim 11, further comprising a different color ink in each of the respective connected bags, containers, and conduits prior to installation in the printer.

13. A method, comprising:
    connecting a first sub-assembly including a primary ink container and a second sub-assembly including an ink supply chamber to receive ink from the primary container and to deliver ink to a printhead;
    priming the first sub-assembly and the second sub-assembly with ink; and
    shipping the primed, connected sub-assemblies from one location to another location,
    wherein the primary ink container is enclosed by a secondary container,
    wherein the secondary container is pressurized after the primed, connected sub-assemblies are installed into a printer.

14. The method of claim 13, further comprising, after shipping, installing the primed, connected sub-assemblies into the printer.

15. The method of claim 14, wherein the primary ink container holds a lifetime supply of ink for a predetermined expected useful life of the printer.

16. The method of claim 14, wherein the primary ink container is one of multiple bags enclosed by the secondary container, wherein each of the multiple bags stores a different color ink, wherein the multiple bags are arranged diagonally and single file in a row such that each succeeding bag rests against and partially overlaps the preceding bag in the row.

17. The assembly of claim 1, wherein the secondary container comprises a vent to depressurize an interior of the second container.

18. The assembly of claim 6, wherein the secondary container comprises a triangular shaped spacer to maintain a diagonal arrangement of the multiple primary containers within the secondary container.

19. The unit of claim 8, wherein the housing comprises a triangular shaped spacer to maintain a diagonal arrangement of the multiple bags within the single housing.

* * * * *